United States Patent
Hilton

(10) Patent No.: US 10,215,651 B2
(45) Date of Patent: Feb. 26, 2019

(54) TRIMMABLE LINKS FOR SELECTIVELY SETTING TRANSDUCER IMPEDANCE

(71) Applicant: KULITE SEMICONDUCTOR PRODUCTS, INC., Leonia, NJ (US)

(72) Inventor: John P. Hilton, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 436 days.

(21) Appl. No.: 15/056,367

(22) Filed: Feb. 29, 2016

(65) Prior Publication Data
US 2017/0248483 A1    Aug. 31, 2017

(51) Int. Cl.
*G01L 9/00*    (2006.01)

(52) U.S. Cl.
CPC .................... *G01L 9/0052* (2013.01)

(58) Field of Classification Search
USPC ............. 324/654–657; 73/766, 777; 219/121
See application file for complete search history.

(56) References Cited

U.S. PATENT DOCUMENTS

| | | |
|---|---|---|
| 3,261,082 A | 7/1966 | Maissel et al. |
| 4,182,024 A | 1/1980 | Cometta |
| 4,381,441 A * | 4/1983 | Desmarais ............. H01C 17/23 219/121.6 |
| 4,442,717 A * | 4/1984 | Kurtz ..................... G01L 9/0055 73/766 |
| 4,679,567 A | 7/1987 | Hanlon et al. |
| 4,699,871 A | 10/1987 | Holz |
| 5,959,200 A * | 9/1999 | Chui ..................... B82Y 35/00 73/105 |

* cited by examiner

*Primary Examiner* — Vincent Q Nguyen
(74) *Attorney, Agent, or Firm* — Troutman Sanders LLP; James E. Schutz; Mark Lehi Jones

(57) ABSTRACT

Systems and methods are disclosed herein for selectively configuring an impedance of a transducer. A configurable transducer system is provided that can include a first region configured for receiving an applied stress and one or more sensing branches in communication with the first region. Each sensing branch can include an active piezoresistive area; three or more conduction paths configured in electrical communication with the active piezoresistive area; one or more trimmable links configured in parallel communication with at least two of the three or more conduction paths; and two or more connection terminals in electrical communication with the three or more conduction paths. The trimmable links are configured to be selectively opened to set a value of nominal impedance associated with the active piezoresistive area based on a desired impedance of the configurable transducer.

17 Claims, 8 Drawing Sheets

TRIMMABLE LINKS FOR SELECTIVELY SETTING TRANSDUCER IMPEDANCE

FIELD

This disclosed technology relates to transducers, and more particularly to trimmable links for selectively setting impedance of a transducer.

BACKGROUND

Transducers can be utilized in a broad range of measurement applications and corresponding environmental conditions. In certain transducers, piezoresistors coupled to a diaphragm may be used to measure a pressure. The piezoresistors may be conventionally arranged as a Wheatstone bridge. Upon the application of pressure, the sensor's diaphragm deflects slightly which induces strain onto the piezoresistors. The piezoresistors respond to this strain by a change of resistance. A Wheatstone bridge configuration, as shown in FIG. 1, typically includes four piezoresistors that are arranged on the diaphragm such that two piezoresistors are put in tension while the other two piezoresistors are placed in compression. This way, two piezoresistors increase in value, while the other two piezoresistors decrease in value by the same or similar amount. By connecting the piezoresistors under tension on opposite arms of the Wheatstone bridge, and by similarly connecting the piezoresistors under compression on the other opposite arms of the Wheatstone bridge, the output of the Wheatstone bridge can produce a voltage which is proportional to the applied pressure.

In a typical pressure measurement application, the transducer is coupled to external instrumentation for reading the associated pressure signals generated by the transducer. The instrumentation can receive and condition the output signal, digitize the received signal, etc. Given the many different measurement applications, a variety of external instrumentation may be designed and interfaced with the pressured transducer for a given application. For optimum sensing performance, it can be desirable to adjust the design variables of the pressure transducer to match those of the instrumentation, or vice-versa.

One of the primary design variables of an electrical device is the impedance of the unit, as measured from the input terminals (input impedance) or output terminals (output impedance). Input impedance requirements may be derived from a need to limit the current or power draw of a unit, due to heating issues or limitations of the driving power source. Output impedances may have different design goals depending on the device end-use, such as impedance matching or bridging to control power or voltage transfer. In many fields, particularly semiconductor fabrication, impedance matching may be complicated by the need to design for impedance at a very early stage of production. While resistors can often be manually inserted into an electrical network to vary impedance at different locations, these resistors will most likely have different secondary properties than the circuit elements directly fabricated into an electrical network via semiconductor fabrication processes. For example, temperature-dependent behavior, resistance to external electrical fields, etc. may differ depending on the method and material used to vary the impedance.

To maintain tolerance and consistency, the impedance is typically set very early in the fabrication process, which can limit flexibility and create overhead as products requiring different impedance ranges are generally manufactured using separate production lines. A method to control the impedance of electrical networks, while following standard semiconductor fabrication would provide significant benefits in cost reduction and production efficiency.

BRIEF SUMMARY

Systems, methods, and apparatus for compensation of a sensor are presented herein in accordance with certain example implementations of the disclosed technology.

In one example implementation, a method is provided that includes determining a desired impedance for a configurable transducer. The configurable transducer is configured with one or more sensing branches, each sensing branch including: an active piezoresistive area; three or more conduction paths configured in electrical communication with the active piezoresistive area; one or more trimmable links configured in parallel communication with at least two of the three or more conduction paths; and two or more connection terminals configured in electrical communication with the three or more conduction paths. The method includes selectively opening, based on the desired impedance, zero or more of the trimmable links to selectively set a value of nominal impedance associated with the active piezoresistive area. In certain example implementations, the method includes selectively opening, based on the desired impedance, one or more of the trimmable links to selectively set a value of nominal impedance associated with the active piezoresistive area.

In another example implementation, a configurable transducer system is provided that can include a first region configured for receiving an applied stress. and one or more sensing branches in communication with the first region. Each sensing branch can include an active piezoresistive area; three or more conduction paths configured in electrical communication with the active piezoresistive area; one or more trimmable links configured in parallel communication with at least two of the three or more conduction paths; and two or more connection terminals in electrical communication with the three or more conduction paths. The trimmable links are configured to be selectively opened to set a value of nominal impedance associated with the active piezoresistive area based on a desired impedance of the configurable transducer.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

The disclosed technology is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

The following detailed description is merely illustrative in nature and is not intended to limit the disclosure or the application and uses of the disclosed technology. Furthermore, there is no intention to be bound by any expressed or implied theory presented in the preceding field of use, background, or summary of the disclosure or the following detailed description. This disclosure provides various examples, embodiments and the like, which may be described herein in terms of functional or logical block elements. Various techniques described herein may be applied for selectively setting impedance associated with a transducer. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Certain example implementations of the disclosed technology enable controlling and/or adjusting parameters of a circuit network following semiconductor fabrication. For example, certain implementations can include trimmable links in the network that can be left in place to effectively leave certain circuit pathways and associated components in communication with the network; or the trimmable links can be opened to selectively remove certain circuit pathways and the associated components from the network. As will be discussed in detail herein, various configurable combinations of the circuit layout may allow flexible and selective setting of impedance values associated with a transducer after initial fabrication.

In certain example implementations, the trimmable links can include conductive electrical junctions where an external force, such as provided by a laser or a knife, can be used following semiconductor fabrication to controllably and predictably alter the associated electrical circuit. For example, by placing trimmable links in the electrical network at key locations on the circuit, production flexibility may be obtained.

In accordance with an example implementation of the disclosed technology, the configurable electrical circuits disclosed herein can include piezoresistive transducer designs, in which trimmable links associated with an on-chip Wheatstone bridge can be configured to control the overall bridge impedance following wafer-level fabrication. Certain example implementations can also include areas which can be trimmed to alter the device "zero" or output with no force or pressure applied to the transducer.

Figure 1:
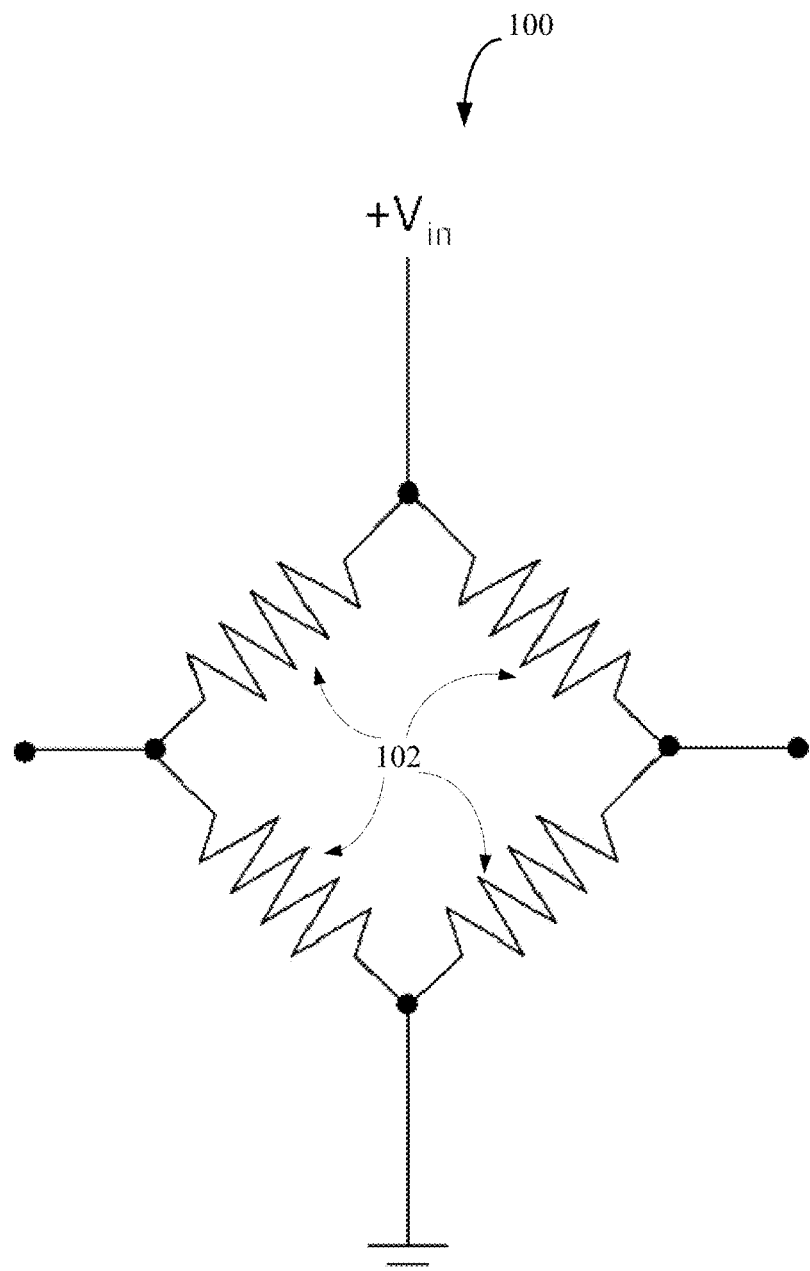
FIG. 1 illustrates a general Wheatstone bridge configuration 100.

FIG. 1 shows a general Wheatstone bridge transducer 100 having four active resistors 102 which can undergo changes in resistance in response to applied pressure.

Figure 2:
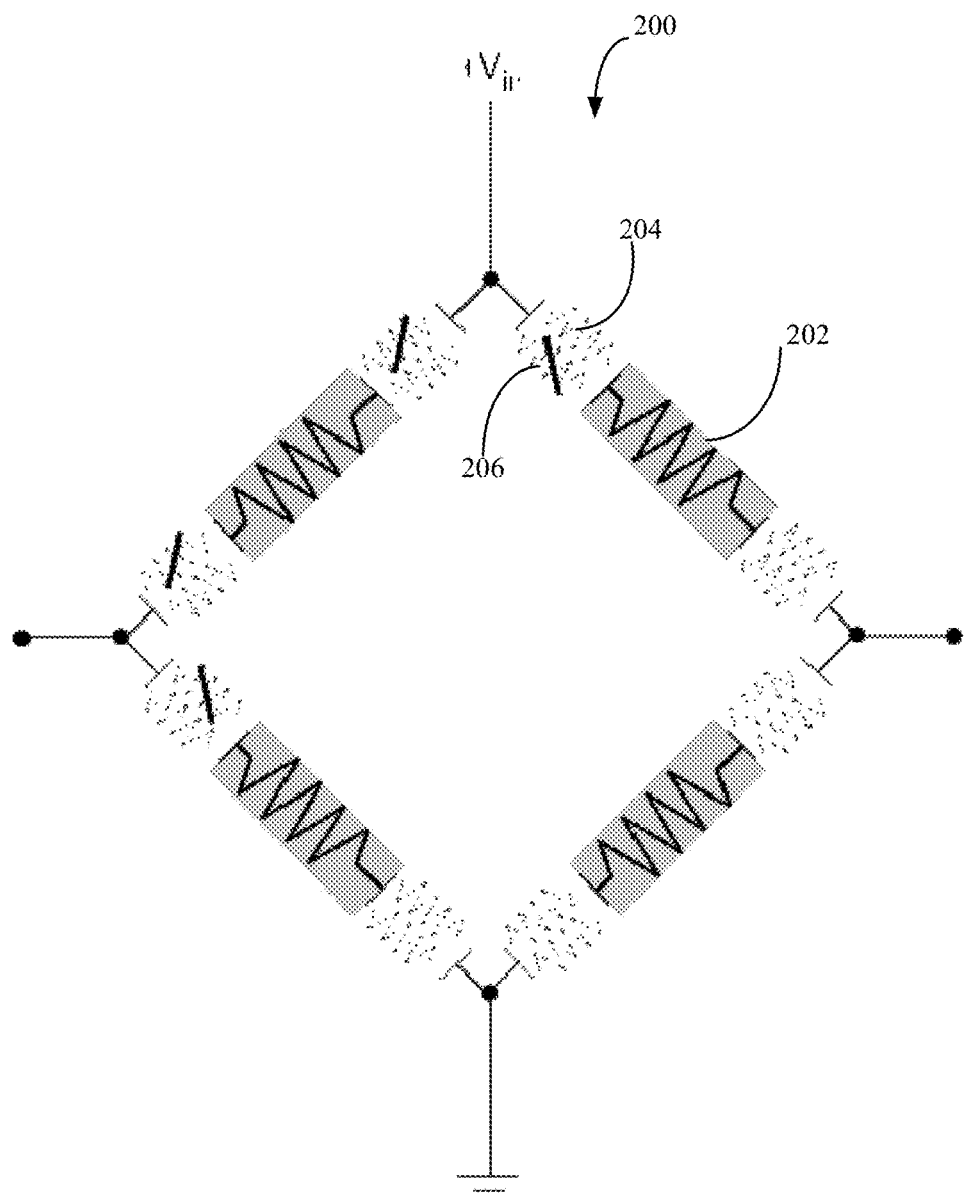
FIG. 2 illustrates an example configurable Wheatstone bridge transducer 200.

FIG. 2 illustrates an example of a configurable Wheatstone bridge transducer 200, according to an example implementation of the disclosed technology. As depicted, this transducer 200 design can include active resistors 202, fixed resistors 204 and/or configurable resistors 206. The active resistors 202 may include piezoresistive areas patterned on (or in communication with) a diaphragm which can respond mechanically to applied stress to provide an output signal that corresponds to the applied stress.

In certain example implementations, the fixed resistors 204 and/or the configurable resistors 206 may be placed in series or parallel combinations with each other, with the combination placed in series with the active resistors 202. In certain example implementations, the fixed resistors 204 and/or the configurable resistors 206 may be configured with resistance smaller than the resistance of the active resistors 202. In certain example implementations, the fixed resistors 204 and/or configurable resistors 206 may be mechanically isolated from the applied stress, or placed such that the applied stress has a negligible influence on their associated impedances, for example, so that the active resistors 202 provide a dominant influence on the resulting output signal.

In accordance with an example implementation of the disclosed technology, the configurable resistors 206 may be designed to include trimmable links in series that can either allow the configurable resistors 206 to remain in the circuit (for example, with the fixed resistors 204) or the trimmable links can be opened to effectively remove the configurable resistors 206 from the circuit.

In accordance with certain example implementations of the disclosed technology, the configurable resistors 206 may be designed to include trimmable links in parallel with the configurable resistors 206 that can effectively bypass the configurable resistors 206 (and the fixed resistors 204 if they are also configured in parallel). In this embodiment, the trimmable links can be opened or severed to effectively remove the bypass and place the configurable resistors 206 in the circuit.

In certain example implementations, the trimmable links may be configured to have very low resistance and/or impedance. For example, in one example implementation, the geometry of the trimmable link may be designed to insure a very low resistance. In another example implementation, metallization (such as used in a circuit trace) may be utilized. In certain example implementations, the trimmable link may form a short to effectively eliminate the fixed resistor 204 from the circuit when placed in parallel with the configurable resistors 206, which can include a parallel trimmable link. In certain example implementations, severing the trimmable link may add the fixed resistor 204 to a given leg of the bridge, for example, to adjust the impedance of that arm of the bridge. Certain example implementations of this design feature may be utilized to adjust a null value of the transducer, or the transducer output at zero applied pressure.

Figure 3:
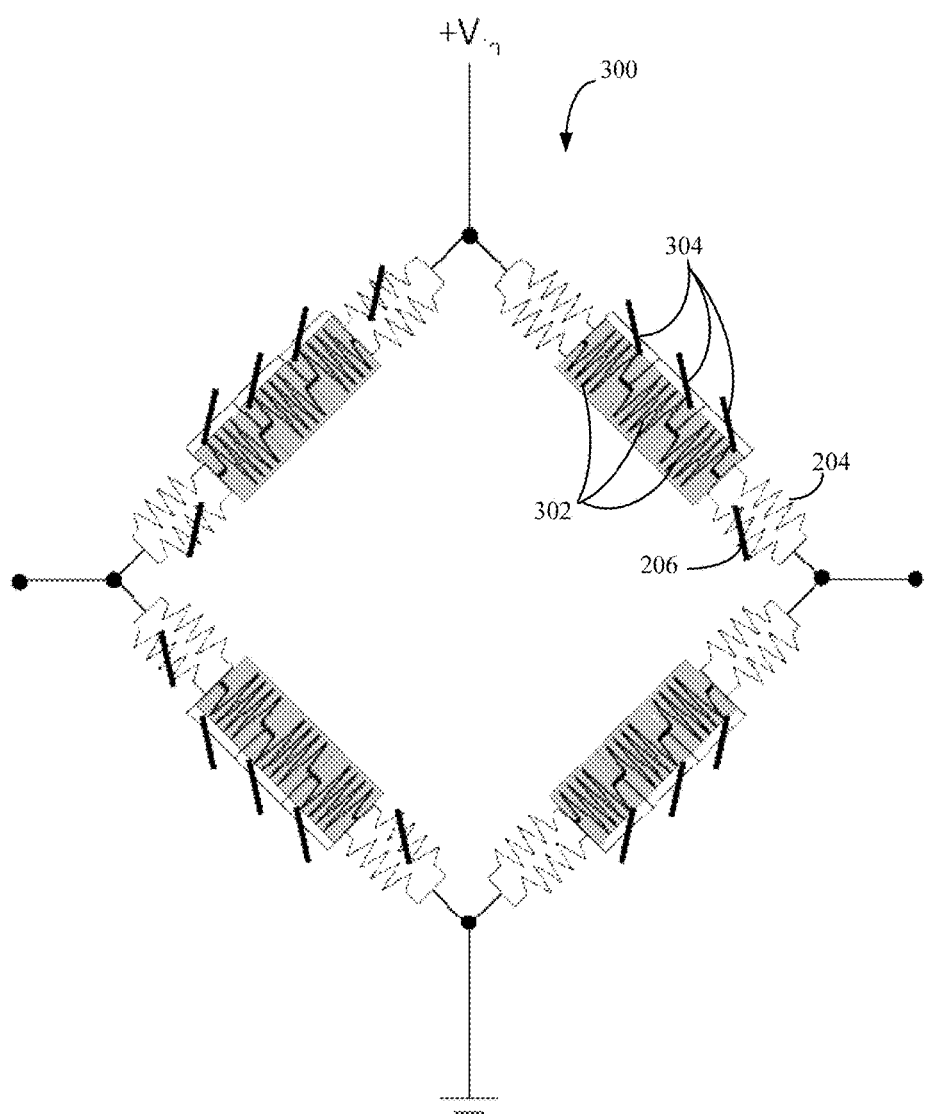
FIG. 3 illustrates another configurable Wheatstone bridge transducer 300 in which the impedance of the piezoresistors 302 may be selectively configured, according to an example implementation of the disclosed technology.

FIG. 3 illustrates a configurable Wheatstone bridge transducer 300 in which the impedance of the active piezoresistors 302 may be selectively configured by associated trimmable links 304, according to an example implementation of the disclosed technology. Certain example implementations of the Wheatstone bridge transducer 300, as depicted in FIG. 3, may build on the design concepts of the fixed resistors 204, the configurable resistors 206, and the associated trimmable links, as discussed above with respect to FIG. 2, with the added feature of the selective impedance configuration of the active piezoresistors 302 by their associated trimmable links 304.

Figure 4:
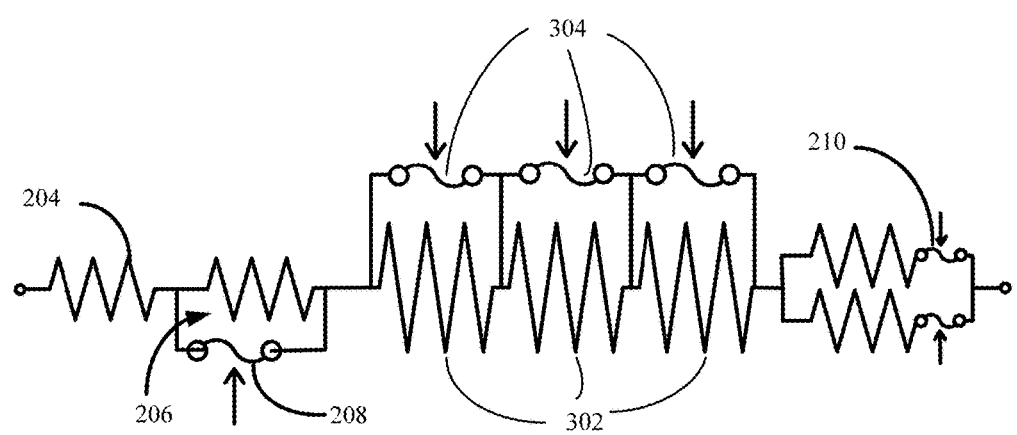
FIG. 4 illustrates a single arm of a Wheatstone bridge transducer in which piezoresistors 302 and associated fixed resistors may be selectively configured, according to an example implementation of the disclosed technology.

FIG. 4 illustrates an example implementation of a single arm of a transducer (such as in the Wheatstone bridge transducer 300 depicted in FIG. 3) in which active piezoresistors 302 may be configured by their associated trimmable links 304. Certain example implementations may include associated fixed 204 and/or configurable resistors 206, which may also be selectively configured via their associated parallel trimmable links 208 and/or series trimmable links 210, according to an example implementation of the disclosed technology. As may be appreciated, a wide variety of parallel/series combinations with can be made by various layout designs of the active piezoresistors 302, associated trimmable links 304, various fixed resistors 204, configurable resistors 206, parallel trimmable links 208, and series trimmable links 210. The illustration in FIG. 4 depicts just one example representative configuration, and should not be considered to limit the scope of the disclosed technology. The illustration in FIG. 4 shows some of the various series/parallel configurations that may be utilized, but certain example implementations may utilize more components, less components, and/or different combinations of series/parallel configurations of the components as needed.

In accordance with an example implementation of the disclosed technology, and as will be explained further with reference to FIGS. 5-7 below, the trimmable links 304 may enable selectively setting an effective impedance value of the active piezoresistors 302, for example, after the initial manufacturing process. In this way, a single device layout may be designed and manufactured, then configured as needed for multiple input/output impedance requirements by selectively severing trimmable links.

Figure 5:
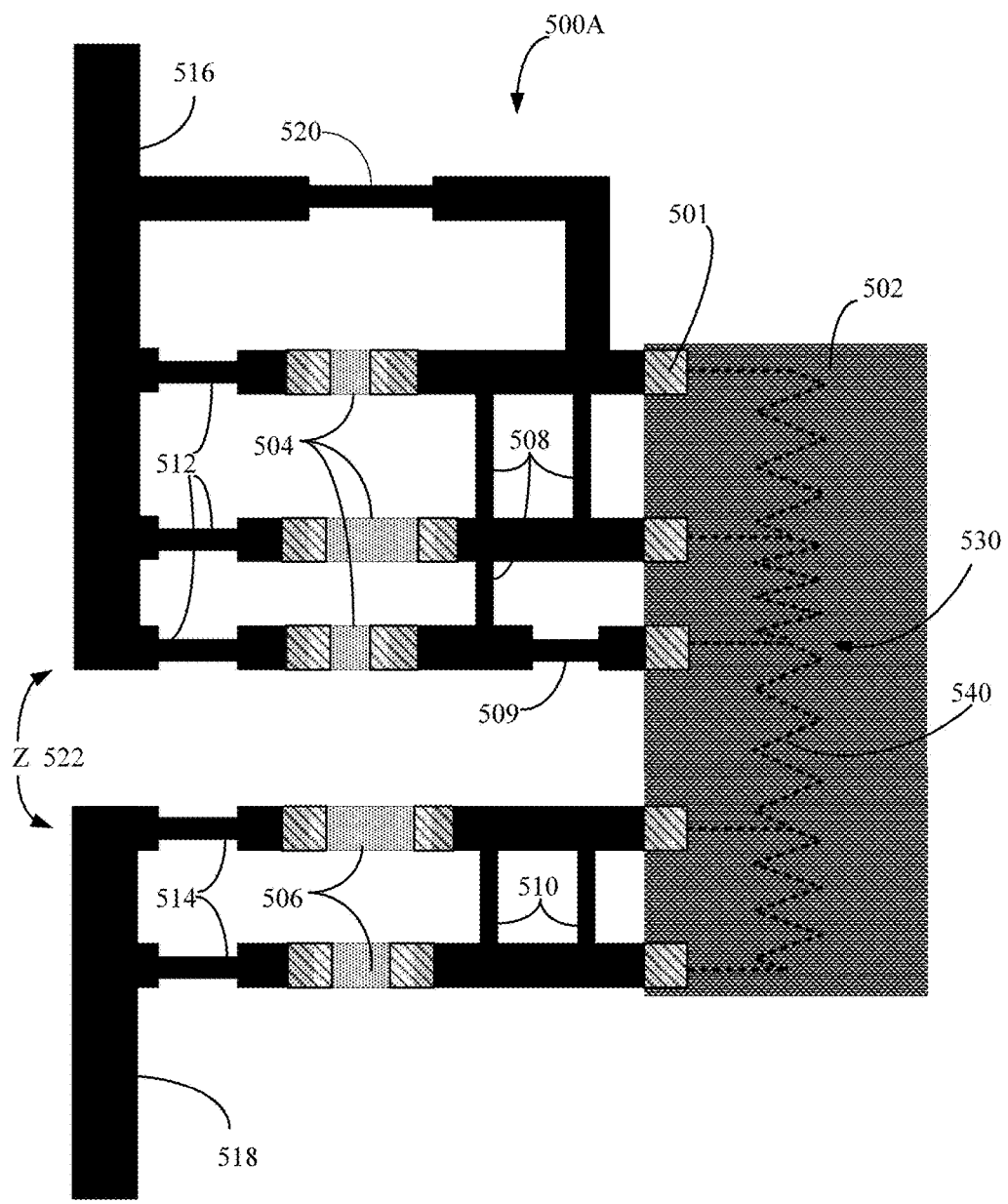
FIG. 5 illustrates an initial layout 500A of configurable fixed resistors and configurable active piezoresistors associated with a transducer, according to an example implementation of the disclosed technology.

FIG. 5 is an illustrative example initial layout 500A of various trimmable links 508, 509, 510, 512, 514, 520, configurable fixed resistors 504, 506 and configurable active piezoresistors 530 associated with a transducer, according to an example implementation of the disclosed technology. FIG. 6 and FIG. 7 illustrate different ways that the initial layout 500A may be configured after the initial manufacturing process, for example, to selectively severing or opening the various trimmable links to set the associated impedance of a transducer arm having a for particular application design requirements. The physical layout illustrations of FIGS. 5-7 are for conceptual purposes only and are not necessarily drawn to scale, nor is it necessary for each and every resistor, circuit trace, trimmable link, or connecting pad as shown to be in an actual device; however, they may be. Certain alternative features of the disclosed technology are also represented in the physical layout illustrations of FIGS. 5-7. Those having skill in the art will appreciate that certain example implementations provide a flexible and configurable transducer.

The example illustration of FIG. 5 depicts an active piezoresistive area 502 that may be connected to an input terminal 516 and an output terminal 518 via various intervening resistors, circuit traces, trimmable links, connecting pads, etc. to produce a certain impedance Z 522 between the terminals 516, 518. In certain example implementations, the components shown in FIG. 5 may correspond to a single branch of a Wheatstone bridge (such as the Wheatstone bridge 300 as shown in FIG. 3 and/or the single branch as shown in FIG. 4). According to an example implementation of the disclosed technology, the active piezoresistive area 502 may be patterned on a diaphragm (or on a substrate in communication with a diaphragm) that may receive force or pressure from a measurement environment. Thus, the active piezoresistive area 502 may undergo a resistance change proportional to an applied force or pressure. In certain example implementations, the piezoresistive area 502 may be deposited or formed on a substrate such that conductive electrical connections are made with two or more contact pads 501. In certain example implementations, the configurable fixed resistors 504, may be deposited or formed in a similar way on an associated substrate 506 and in communication with conductive traces (for example, via associated contact pads).

By way of an example, the initial layout 500A would have an overall impedance Z 522 (as seen across the terminals 516, 518) approximately equal to the active resistance section 540 plus a parallel combination of the two lower configurable fixed resistors 506, by virtue of the presence of all of the various trimmable links 508, 509, 510, 512, 514, 520.

Figure 6:
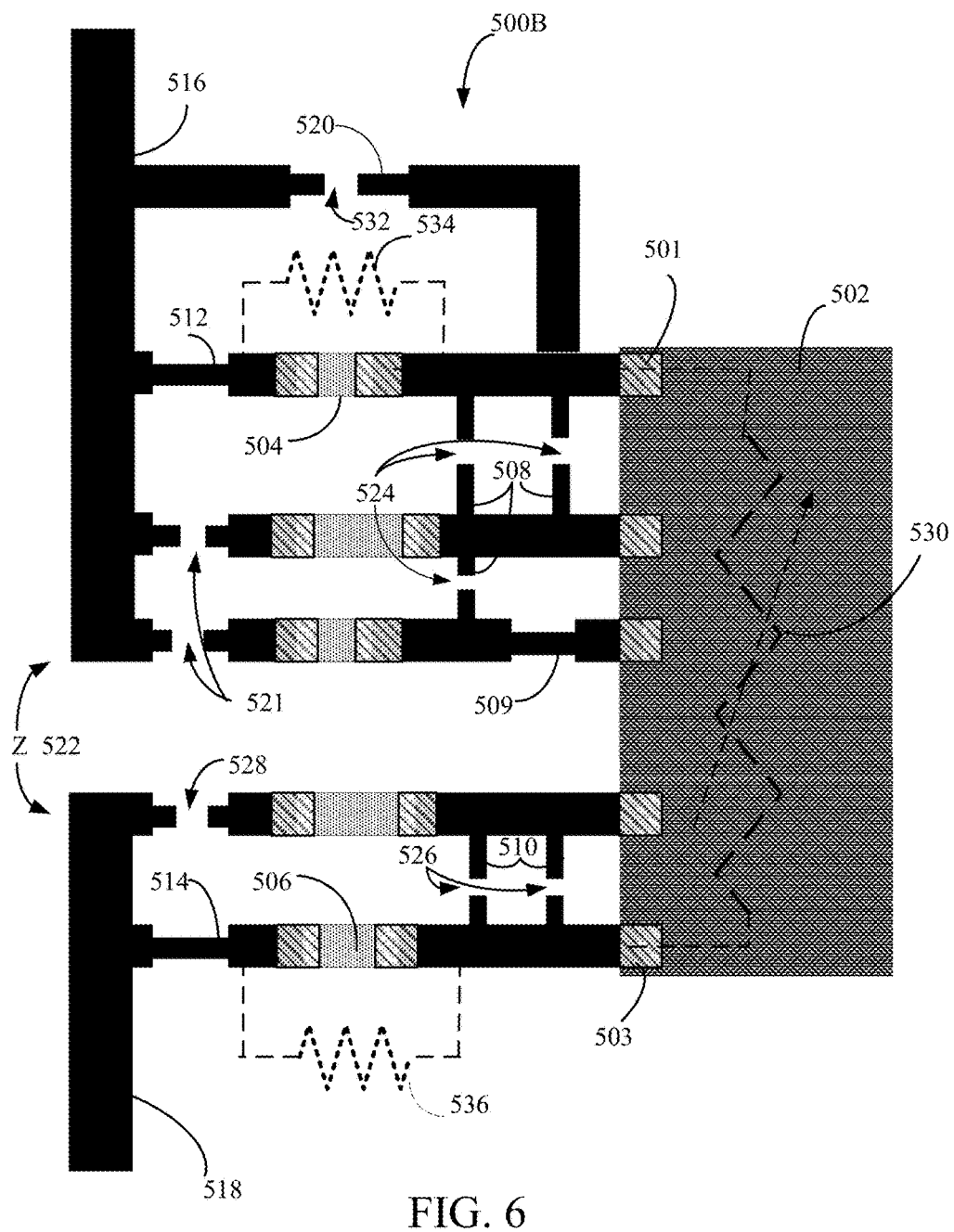
FIG. 6 illustrates an example layout 500B of configurable fixed resistors and configurable active piezoresistors associated with a transducer, in which certain circuit paths are selectively opened and/or left in place to selectively configure corresponding elements from the circuit to set the corresponding impedance, according to an example implementation of the disclosed technology.

FIG. 6 illustrates an example layout 500B (similar to the initial layout 500A as shown in FIG. 5), in which certain circuit paths are selectively opened and/or left in place to selectively configure corresponding elements from the circuit to set active and fixed impedance, according to an example implementation of the disclosed technology. For example, in this embodiment, certain specific trimmable links are severed or opened 521, 524, 526, 528, 532. In accordance with an example implementation of the disclosed technology, the layout 500B may have an overall impedance Z 522 (as seen across the terminals 516, 518) approximately equal to a series combination of the upper resistor 534 that remains in circuit, the active resistance section 530 between the top 501 and bottom 503 contact pads, and the lower resistor 536 that remains in the circuit. Since the trimmable links have been configured in this example to essentially remove components that are not connected to the top 501 and bottom 503 contact pads (that are connected to the piezoresistive area 502), a maximum initial active resistance 530 may be selectively configured in this configuration.

Figure 7:
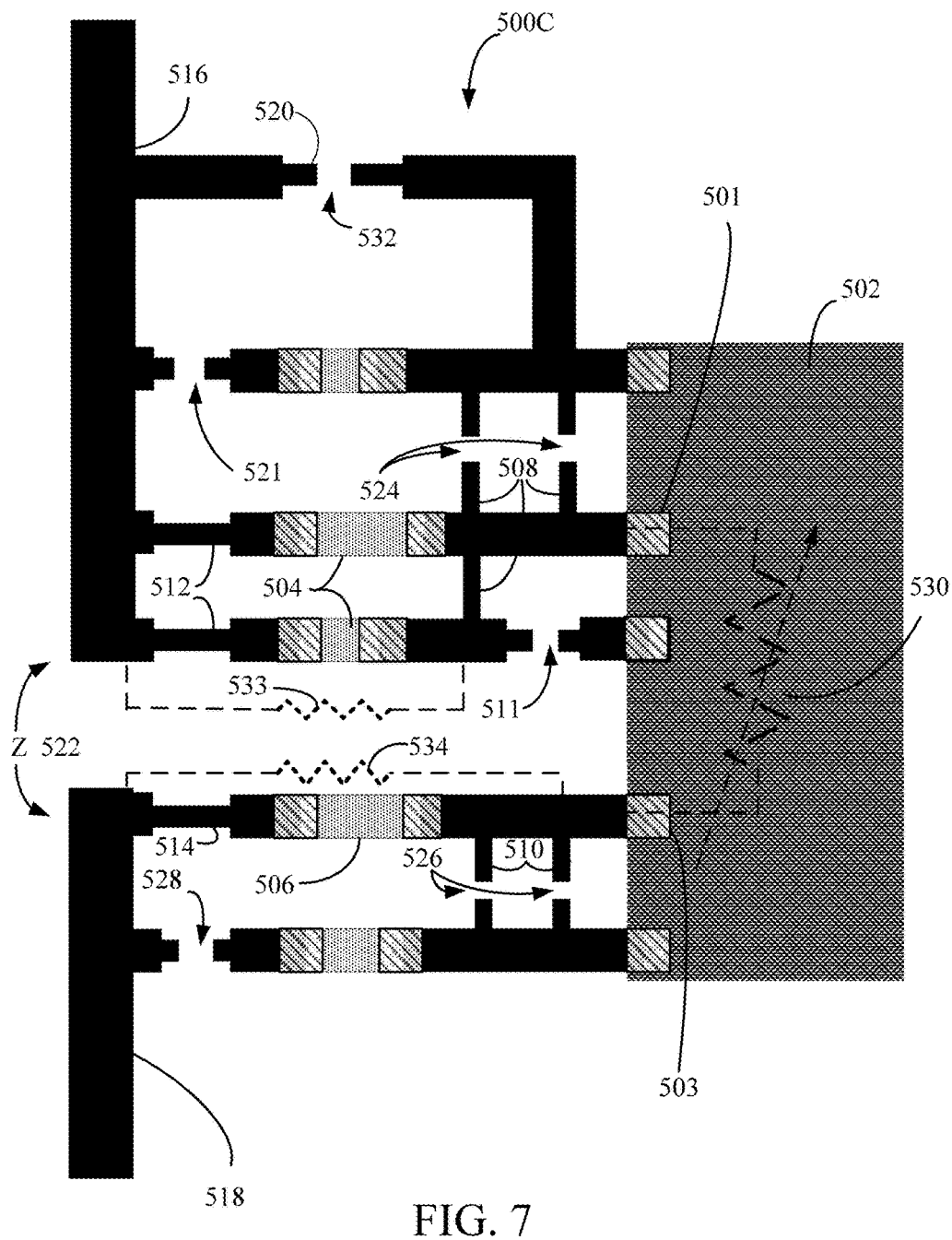
FIG. 7 illustrates another example layout 500C of configurable fixed resistors and configurable active piezoresistors associated with a transducer, according to an example implementation of the disclosed technology.

FIG. 7 illustrates another example layout 500C (for example, starting with the initial layout of 500A in FIG. 5) in which certain circuit paths are selectively opened and/or left in place to selectively configure corresponding elements to set the active and fixed impedance, according to an example implementation of the disclosed technology. For example, in this embodiment, certain specific trimmable links may be severed or opened 511, 521, 524, 526, 528, 532. In accordance with an example implementation of the disclosed technology, the layout 500C may have an overall impedance Z 522 (as seen across the terminals 516, 518) approximately equal to a first resistance 533 which is a parallel combination of two of the remaining configurable fixed resistors 504, the remaining active resistance section 530 between the connected upper 501 and lower 503 contact pads, and the lower resistor 534 that remains in the circuit due to the remaining configurable fixed resistor 506. Since the trimmable links have been configured in this example to essentially remove components that are not connected to the shown upper 501 and lower 503 contact pads (that are connected to the piezoresistive area 502), a medium values of active resistance 530 may be selectively configured in this configuration.

As may be appreciated, if an even lower value of the active resistance 530 were desired, the severed 511 trimmable link may have been left in place, thereby exposing less piezoresistive material in series with the circuit.

The foregoing examples and figures are provided as illustrative examples. As may be appreciated, a wide variety of parallel/series combinations can be made by various layout designs of the active piezoresistors, associated trimmable links, various fixed resistors, configurable resistors, parallel trimmable links, and series trimmable links. The illustrations in FIGS. 5-7 depict certain example representative configurations, and should not be considered to limit the scope of the disclosed technology. Certain example implementations may utilize more components, less components, and/or different combinations of series/parallel configurations of the components as needed.

According to certain example implementations, one or more of the resistive networks may include low temperature coefficient (TC) resistors that may be configured after assembly or partial assembly. For example, in one embodiment, one or more of the resistors associated with the compensating network(s) may be laser trimmable to adjust or refine its value.

In accordance with an example implementation, a compensating network may be configurable by the opening of certain electrical connections, trimmable links, and/or traces between compensating resistors that are arranged in a series/parallel electrical configuration. In other words, any or all of the configurable and/or fixed resistor as referred to previously may be utilized to form compensation. For example, specific traces may be opened using focused laser light. In certain other example implementations, traces may be opened using removable solder bridges. In yet other example implementations, specific traces may be opened using mechanical means, such as a blade. In some example implementations, certain connection(s) among the resistive networks may be configured (opened) then specific resistors may be trimmed to fine tune the compensating network(s). In such a configuration, one or more configurable resistors may be used to compensate a sensor for temperature, humidity, pressure, another environmental condition, or the like.

In certain example implementations, one or more portions of the resistive material may be removed, trimmed, or otherwise cut to increase the resistance and/or impedance of a trimmable resistor. In one example, a laser may be used to produce the trimmed portion. In one example implementation, the trimmed portion of resistive material may be removed to increase the component resistance and/or impedance. According to an example implementation of the disclosed technology, the trimmable resistor may be a low-temperature coefficient (low-TC) resistor.

Figure 8:
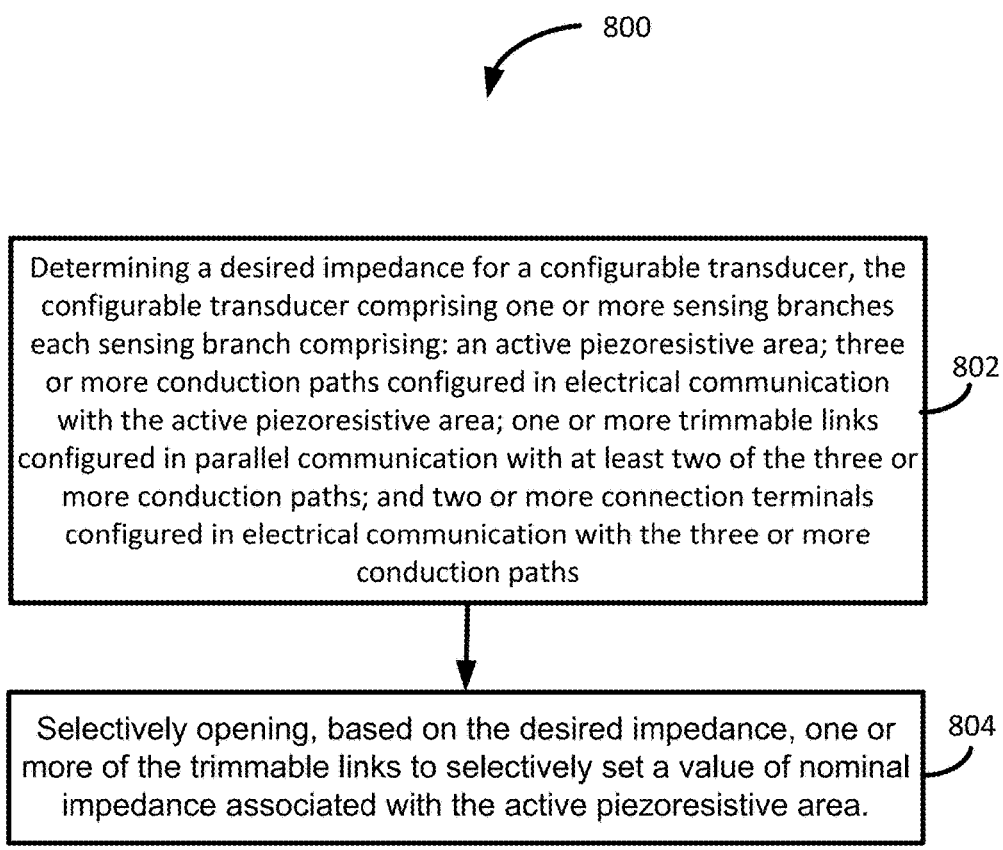
FIG. 8 is a flow-diagram of a method, according to an example implementation of the disclosed technology.

FIG. 8 is a flow-diagram of a method 800, according to an example implementation of the disclosed technology. In block 802, the method 800 includes determining a desired impedance for a configurable transducer, the configurable transducer comprising one or more sensing branches, each sensing branch comprising: an active piezoresistive area; three or more conduction paths configured in electrical communication with the active piezoresistive area; one or more trimmable links configured in parallel communication with at least two of the three or more conduction paths; and two or more connection terminals configured in electrical communication with the three or more conduction paths In block 804, the method 800 includes selectively opening, based on the desired impedance, zero or more of the trimmable links to selectively set a value of nominal impedance associated with the active piezoresistive area.

Certain example implementations can include selectively opening, based on the desired impedance, one or more of the trimmable links to selectively set a value of nominal impedance associated with the active piezoresistive area.

In certain example implementations, the method includes selectively shorting, based on the desired impedance, one or more open trimmable links to selectively set a value of nominal impedance associated with the active piezoresistive area.

In certain example implementations, the three or more conduction paths may be configured in electrical communication with different and independent regions of the active piezoresistive area such that corresponding finite nominal impedances are configured between each of the three or more conduction paths.

According to an example implementation of the disclosed technology, each sensing branch may be further configured to include, as applicable, at least one configurable resistor in electrical communication with one or more of the conduction paths and one or more of the connection terminals. The at least one configurable resistor includes, as applicable, one or more of: a configurable resistor trimmable link in a series configuration, and a configurable resistor trimmable link in a parallel configuration. In certain example implementations, selectively opening includes opening one or more configurable resistor trimmable link to set a value of nominal impedance associated the configurable resistor.

In accordance with an example implementation of the disclosed technology, the one or more sensing branches are combined in a Wheatstone bridge configuration in communication with a region configured for receiving an applied stress. In certain example implementations, the region configured for receiving the applied stress can include diaphragm.

Certain example implementations include mechanically packaging the configurable transducer.

In accordance with an example implementation of the disclosed technology, selectively opening the trimmable links can include removing one or more pre-configured series or parallel shorts after initial manufacturing of the configurable transducer.

Certain example implementations include mechanically packaging the configurable resistor network with the sensor.

According to an example implementation of the disclosed technology, selectively configuring the one or more configurable resistor networks includes opening one or more pre-configured series or parallel shorts associated with one or more resistors in the configurable resistor network.

In certain example implementations, selectively configuring the one or more configurable resistor networks can include laser trimming one or more resistors in the configurable resistor network.

In certain example implementations, the sensor may be a pressure sensor. In another example implementation, the sensor may be a temperature sensor. In another example implementation, the sensor may be a humidity sensor. In another example implementation, the sensor may be part of an accelerometer. Embodiments of the disclosure may include other environmental sensors. In certain example implementations, the sensor may include a Wheatstone bridge.

According to an example implementation of the disclosed technology, the characterizing of the sensor and/or determining the response of the sensor may be performed during operation of the sensor. In certain example implementations, a response of the sensor and/or the associated impedance of the sensor may be characterized by testing a sensor under predetermined test conditions. For example, a sensor may be electrically connected to a test apparatus such that an energizing and/or bias voltage is applied to terminals of the transducer. In certain example implementations, an output from the sensor may be monitored by the test apparatus under various test conditions, which may include one or more of varying frequencies and/or amplitudes of pressure, acceleration, and/or temperature. In certain example implementations, an input impedance of the test apparatus may be varied. In an example implementation, one or more of the trimmable links may be configured based on the characterization of the sensor under the predetermined test conditions.

In certain example implementations, the one or more configurable resistor networks may be packaged with a sensor. In accordance with an example implementation of the disclosed technology, the one or more configurable resistor networks include one or more pre-configured series or parallel selectively configurable shorts associated with one or more resistors in the configurable resistor network, wherein one or more of the selectively configurable shorts are selectively opened to provide a compensation impedance value.

In certain example implementations, the one or more configurable resistor networks can include one or more laser trimmable resistors.

In certain example implementations, the temperature response of the sensor may be characterized during operation of the sensor under specific test conditions.

In an example implementation, one or more resistors in the configurable resistor network may be a low-temperature coefficient (low-TC) resistor.

In certain example implementations, the sensor includes one or more piezoresistors.

In certain example implementations, the one or more resistors may be configured to provide a compensation impedance value to compensate for one or more of temperature, humidity, and pressure.

According to an example implementation of the disclosed technology, the one or more resistor networks comprise an array of low-TC resistors mounted on a ceramic substrate.

According to an example implementation of the disclosed technology, the one or more configurable resistor networks may be packaged with the sensor, and the package may include a window or port configured for optically and/or physically accessing the one or more configurable resistor networks and that allow for selectively configuring the one or more configurable resistor networks.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The term "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, certain modifications and changes may be made without departing from the scope of the disclosed technology, as set forth in the claims below. For example, although the example methods, devices and systems, described herein are in conjunction with a pressure transducer or a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

I claim:
1. A method, comprising:
   determining a desired impedance for a configurable transducer, the configurable transducer comprising one or more sensing branches, each sensing branch comprising:
   an active piezoresistive area;
   three or more independent conduction paths configured in electrical communication with different regions of the active piezoresistive area;

one or more trimmable links configured in parallel communication with at least two of the three or more conduction paths; and two or more connection terminals configured in electrical communication with the three or more conduction paths; and selectively opening, based on the desired impedance, one or more of the trimmable links to selectively set a value of nominal impedance associated with the active piezoresistive area.

2. The method of claim 1, wherein the three or more conduction paths are configured in electrical communication with different and independent regions of the active piezoresistive area such that corresponding finite nominal impedances are configured between each of the three or more conduction paths.

3. The method of claim 1, wherein each sensing branch is further configured to include:

at least one configurable resistor in electrical communication with one or more of the conduction paths and one or more of the connection terminals, wherein the at least one configurable resistor includes one or more of:

a configurable resistor trimmable link in a series configuration, and a configurable resistor trimmable link in a parallel configuration; and wherein the selectively opening includes opening one or more configurable resistor trimmable link to set a value of nominal impedance associated with the configurable resistor.

4. The method of claim 1, wherein the one or more sensing branches are combined in a Wheatstone bridge configuration in communication with a region configured for receiving an applied stress.

5. The method of claim 4, wherein the region for receiving the applied stress comprises a diaphragm.

6. The method of claim 1, wherein selectively opening comprises removing one or more pre-configured series or parallel shorts after initial manufacturing of the configurable transducer.

7. The method of claim 1, wherein the configurable transducer is configured as a pressure sensor.

8. A configurable transducer system, comprising:

a first region configured for receiving an applied stress;

one or more sensing branches in communication with the first region, each sensing branch comprising:

an active piezoresistive area;

three or more independent conduction paths configured in electrical communication with different regions of the active piezoresistive area;

one or more trimmable links configured in parallel communication with at least two of the three or more conduction paths; and two or more connection terminals in electrical communication with the three or more conduction paths;

wherein one or more of the trimmable links are configured to be selectively opened to set a value of nominal impedance associated with the active piezoresistive area based on a desired impedance of the configurable transducer.

9. The configurable transducer system of claim 8, further comprising:

an input voltage source connected to one or more of the connection terminals.

10. The configurable transducer system of claim 8, wherein the three or more conduction paths are in electrical communication with different and independent regions of the active piezoresistive area such that corresponding finite nominal impedances are between each of the three or more conduction paths.

11. The configurable transducer system of claim 8, wherein each sensing branch further includes:

at least one configurable resistor in electrical communication with one or more of the conduction paths and one or more of the connection terminals, wherein the at least one configurable resistor includes one or more of:

a configurable resistor trimmable link in a series configuration, and a configurable resistor trimmable link in a parallel configuration; and wherein the selectively opening includes opening one or more configurable resistor trimmable links to set a value of nominal impedance associated the configurable resistor.

12. The configurable transducer system of claim 8, wherein the one or more sensing branches form a Wheatstone bridge configuration.

13. The configurable transducer system of claim 8, wherein the first region comprises a diaphragm.

14. The configurable transducer system of claim 8, wherein the zero or more of the trimmable links include one or more series and parallel shorts.

15. The configurable transducer system of claim 8, wherein the configurable transducer is configured for measuring a pressure.

16. The configurable transducer system of claim 8, further comprising one or more low-TC (low-temperature coefficient) resistors.

17. The configurable transducer system of claim 8, wherein the trimmable links are laser trimmable.

* * * * *